(12) United States Patent
McCarra

(10) Patent No.: US 11,549,595 B2
(45) Date of Patent: Jan. 10, 2023

(54) SYSTEMS AND METHODS FOR RISING STEM BALL VALVES

(71) Applicant: SCV Valve, LLC, Santa Fe, TX (US)

(72) Inventor: Sidney McCarra, League City, TX (US)

(73) Assignee: SCV VALVE, LLC, Santa Fe, TX (US)

( * ) Notice: Subject to any disclaimer, the term of this patent is extended or adjusted under 35 U.S.C. 154(b) by 0 days.

(21) Appl. No.: 17/077,476

(22) Filed: Oct. 22, 2020

(65) Prior Publication Data
US 2021/0123536 A1 Apr. 29, 2021

Related U.S. Application Data

(60) Provisional application No. 62/925,643, filed on Oct. 24, 2019.

(51) Int. Cl.
| | | |
|---|---|---|
| *F16K 5/06* | (2006.01) | |
| *F16K 5/22* | (2006.01) | |
| *F16K 5/20* | (2006.01) | |
| *F16K 31/524* | (2006.01) | |

(52) U.S. Cl.
CPC .......... *F16K 5/0636* (2013.01); *F16K 5/201* (2013.01); *F16K 5/227* (2013.01); *F16K 31/52458* (2013.01)

(58) Field of Classification Search
CPC ........ F16K 5/0636; F16K 5/227; F16K 5/201; F16K 5/0647; F16K 31/508; F16K 31/502; F16K 31/5284; F16K 31/52458
USPC ........................................ 251/360, 363, 316
See application file for complete search history.

(56) References Cited

U.S. PATENT DOCUMENTS

| | | | | |
|---|---|---|---|---|
| 3,515,371 A | * | 6/1970 | Will, Jr. .................. | F16K 41/02 251/214 |
| 4,234,157 A | * | 11/1980 | Hodgeman ......... | F16K 31/5284 251/215 |
| 4,332,370 A | * | 6/1982 | Williams .............. | F16K 5/0285 137/72 |
| 4,506,864 A | * | 3/1985 | Hartmann ............... | F16K 5/201 251/174 |
| 4,869,450 A | * | 9/1989 | Takeda .................. | F16K 5/0626 251/315.05 |
| 5,263,685 A | * | 11/1993 | Winnike ................. | F16K 5/204 251/163 |

(Continued)

FOREIGN PATENT DOCUMENTS

WO WO-2020005067 A1 * 1/2020

*Primary Examiner* — Mary E McManmon
*Assistant Examiner* — Andrew J Rost
(74) *Attorney, Agent, or Firm* — Bookoff McAndrews, PLLC

(57) ABSTRACT

A ball valve system includes a body having an upstream end and a downstream end and a ball within the body between the upstream end and the downstream end, the ball being rotatable about a vertical axis to move between a closed position and an open position. The ball valve assembly includes a stem movable in an actuation direction substantially parallel to the vertical axis, the stem including a recess at a proximal portion of the stem, a guiding member extending within the recess of the stem, the guiding member being configured to prevent rotation of the stem or cause rotation of the stem, and a lubrication port in fluid communication with the recess.

6 Claims, 5 Drawing Sheets

(56) References Cited

U.S. PATENT DOCUMENTS

| | | | | |
|---|---|---|---|---|
| 5,417,405 A | * | 5/1995 | Stephan | F16K 5/204 251/161 |
| 9,784,068 B2 | * | 10/2017 | Allen | F16K 31/60 |
| 9,903,483 B2 | * | 2/2018 | Liu | F16K 5/204 |
| 10,221,651 B2 | * | 3/2019 | Allen | F16K 31/5284 |

* cited by examiner

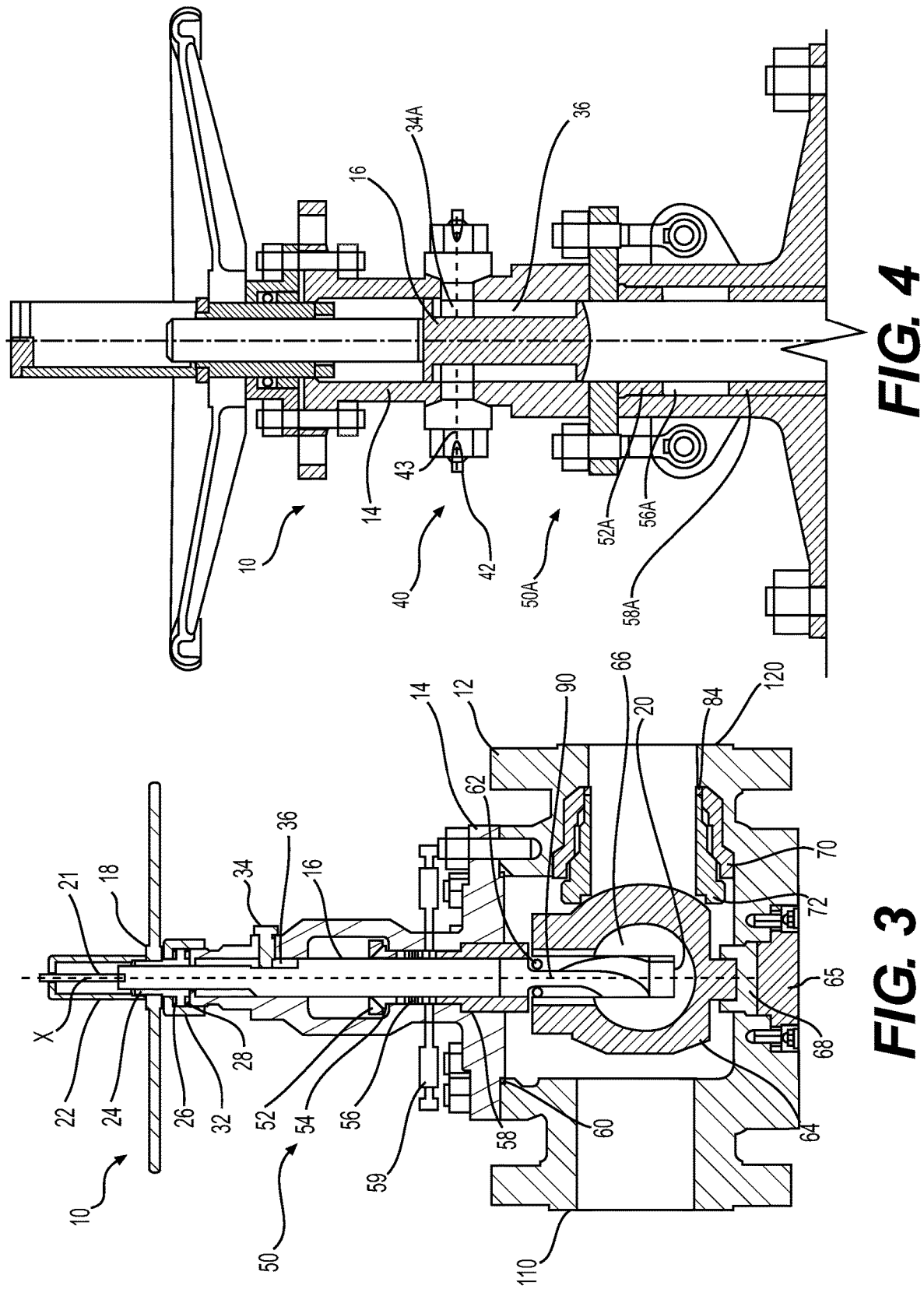

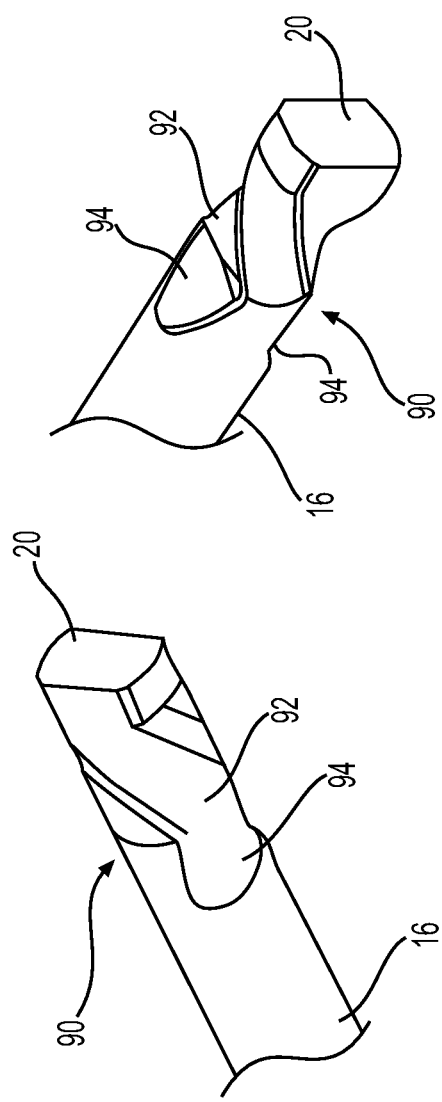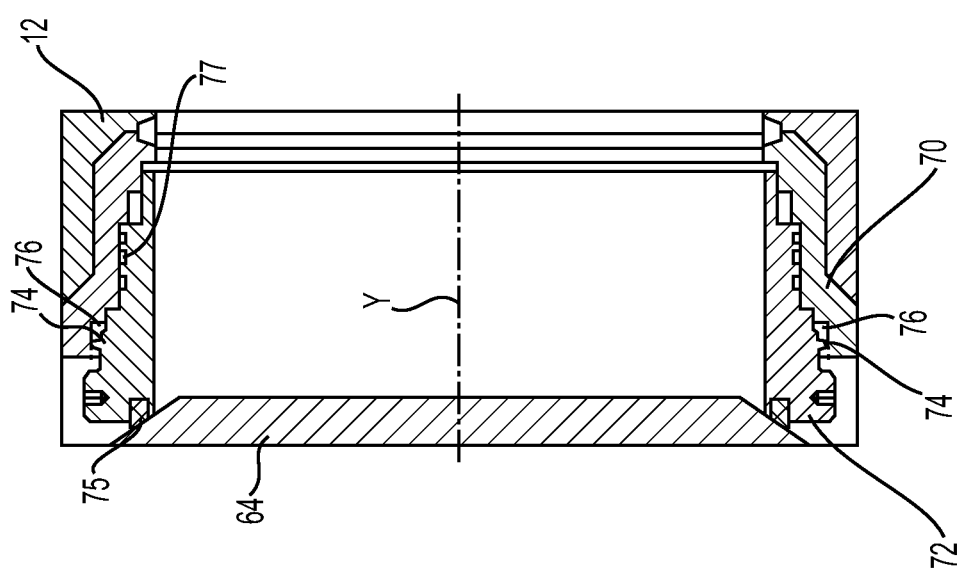

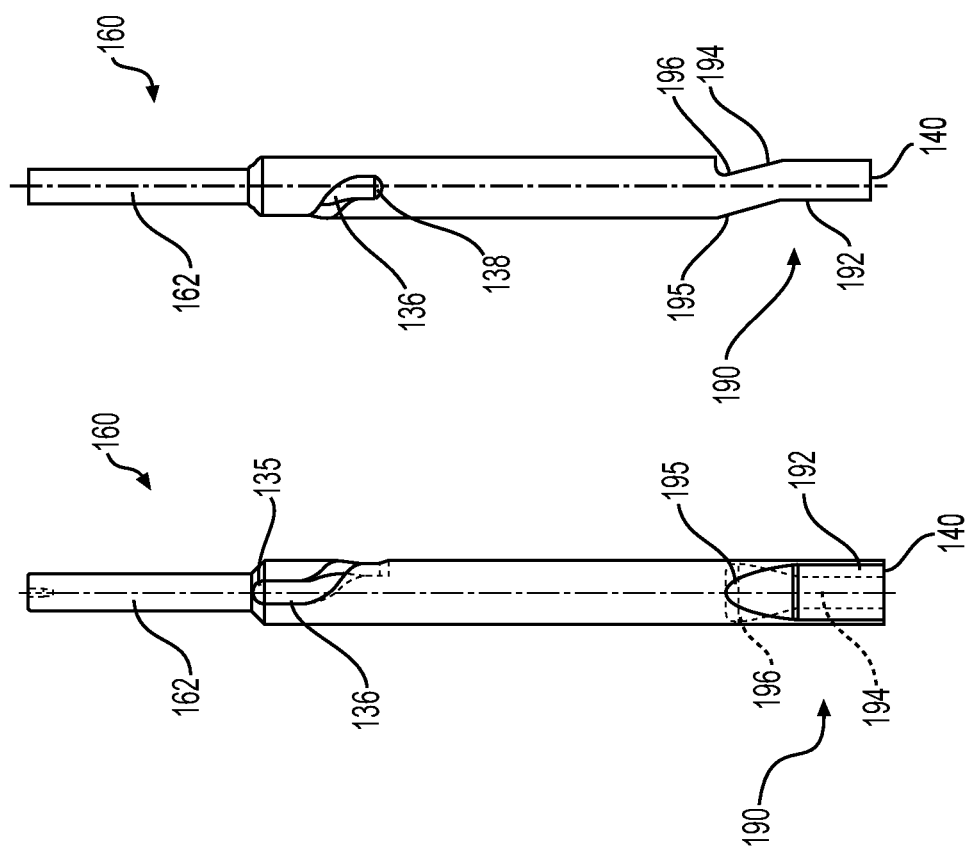
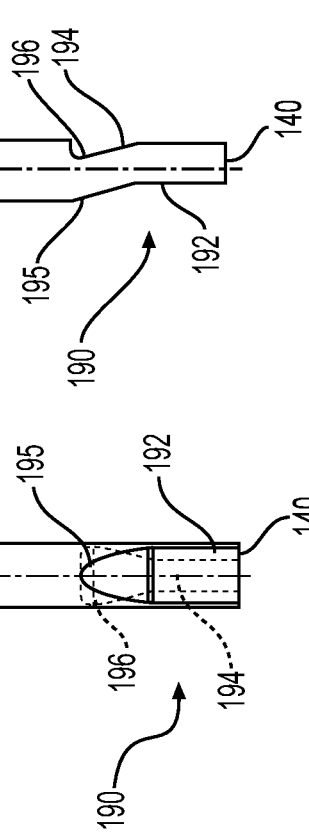
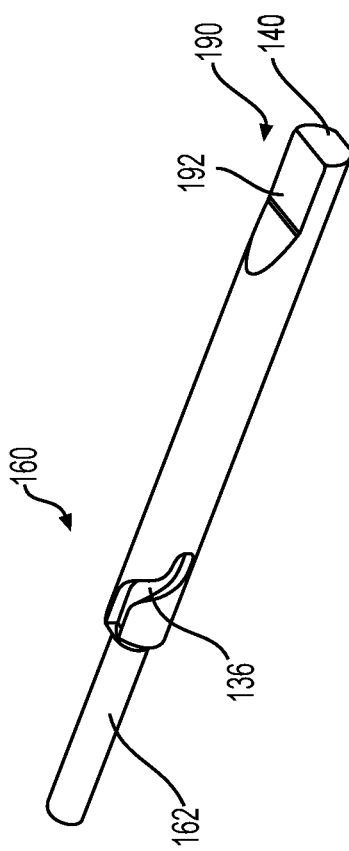
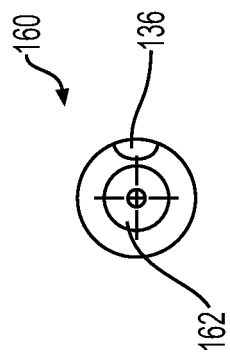

SYSTEMS AND METHODS FOR RISING STEM BALL VALVES

CROSS-REFERENCE TO RELATED APPLICATION(S)

This application claims the benefits of priority to U.S. Provisional Application No. 62/925,643, filed on Oct. 24, 2019, the entirety of which is herein incorporated by reference.

TECHNICAL FIELD

Aspects of the present disclosure relate generally to valves and valve systems. In particular, aspects of the present disclosure relate to methods and systems for ball valve assemblies, such as ball valve assemblies that include a vertically-movable stem.

BACKGROUND

Valve devices, such as ball valve assemblies, are useful for fluid handling in, for example, the oil and gas, power, chemical, water works, waste water, and manufacturing industries. Ball valves assemblies are useful to selectively permit or block the flow of large volumes of fluid. Ball valves are robust systems that operate in harsh environments and under severe conditions. In order to perform in under these circumstances, valve systems include components that are resistant to debris, corrosion, and wear. Additionally, components are regularly inspected and maintained to ensure continued operation of the valve. Even when inspections and maintenance are performed with sufficient frequency, wear occurs on moving parts that are difficult or impossible to access while the valve is in service. For example, valve seats can experience significant wear caused by repeated movement associated with opening and closing of the valve. Additionally, components for actuating a ball of the ball valve assembly may experience undesirable rotation, vibration, and wear.

SUMMARY

According to certain embodiments, systems and methods are disclosed for a rising stem ball valve assembly for fluid handling.

In one aspect, a ball valve system may include a body having an upstream end and a downstream end and a ball within the body between the upstream end and the downstream end, the ball being rotatable about a vertical axis to move between a closed position and an open position. The ball valve assembly may include a stem movable in an actuation direction substantially parallel to the vertical axis, the stem including a recess at a proximal portion of the stem, a guiding member extending within the recess of the stem, the guiding member being configured to prevent rotation of the stem or cause rotation of the stem, and a lubrication port in fluid communication with the recess.

In another aspect, a valve system may include a body having an upstream end and a downstream end, a ball provided between the upstream end and the downstream end, the ball being rotatable about a vertically-extending axis of rotation to move between a closed position and an open position, and a vertically-translateable stem. The valve system may also include a valve seat retainer secured to the body and a seat ring secured to the valve seat retainer and including a portion configured to contact a surface of the ball, the valve seat ring being removable from the valve seat retainer.

In yet another aspect, a method of assembling a ball valve system may include securing a ball within a body, the body including an upstream end and a downstream end and inserting a vertically-translateable stem within the ball, the stem including a proximal recess and a distal recess. The method may also include forming a lubrication channel in the ball valve assembly, the lubrication channel being positioned to supply lubricant to the proximal recess, and inserting a removable valve seat ring within a valve seat retainer, the valve seat ring being configured to receive and contact a portion of the ball with a seat insert.

In one aspect, a ball valve assembly may include a body having an upstream end and a downstream end, a ball provided between the upstream end and the downstream end, the ball being rotatable about an axis of rotation to move between a closed position and an open position, and a stem movable in a direction substantially parallel to the axis of rotation, the stem including a recess. The ball valve assembly may also include a pin within the recess of the stem configured to limit rotation of the stem and a lubricant port in fluid communication with the recess.

In another aspect, a ball valve assembly may include a body having an upstream end and a downstream end and a ball provided between the upstream end and the downstream end, the ball being rotatable about an axis of rotation to move between a closed position and an open position. The ball valve assembly may also include a valve seat secured to the body and a lubricant port in fluid communication with the recess.

In another aspect, a ball valve assembly may include a body having an upstream end and a downstream end, a ball provided between the upstream end and the downstream end, the ball being rotatable about an axis of rotation to move between a closed position and an open position, and a stem extending within the body and movable in a direction substantially parallel to the axis of rotation to open and close the ball valve assembly, wherein the stem includes a twist portion.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 3 is a cross-sectional view of the rising ball valve system of FIG. 1 along line III-III of FIG. 2;

FIG. 4 is a cross-sectional view along line IV-IV of FIG. 2, illustrating features of a rising stem ball valve system according to aspects of the present disclosure;

FIG. 5 is a cross-sectional view of a valve seat retainer and valve seat ring of the rising stem ball valve system of FIG. 1;

FIGS. 6A and 6B are detailed views of a distal portion of a stem of the rising stem ball valve system;

FIG. 7 is a perspective view of a stem formed without a distal twist portion according to aspects of the present disclosure;

FIG. 8 is a top view of the stem of FIG. 7;

FIGS. 9A and 9B are front and side views of the stem of FIG. 7; and

DETAILED DESCRIPTION

Both the foregoing general description and the following detailed description are exemplary and explanatory only and are not restrictive of the features, as claimed. As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus. Moreover, in this disclosure, relative terms, such as, for example, "about," "substantially," "generally," and "approximately" are used to indicate a possible variation of ±10% in the stated value.

Figure 1:
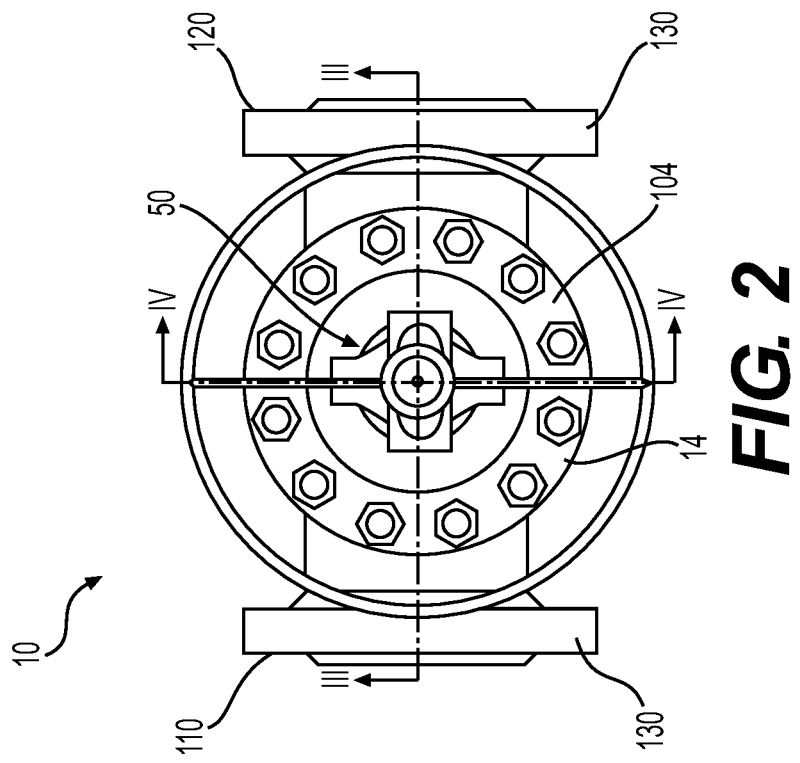
FIG. 1 is a perspective view of a rising stem ball valve system, according to aspects of the present disclosure.
Figure 2:
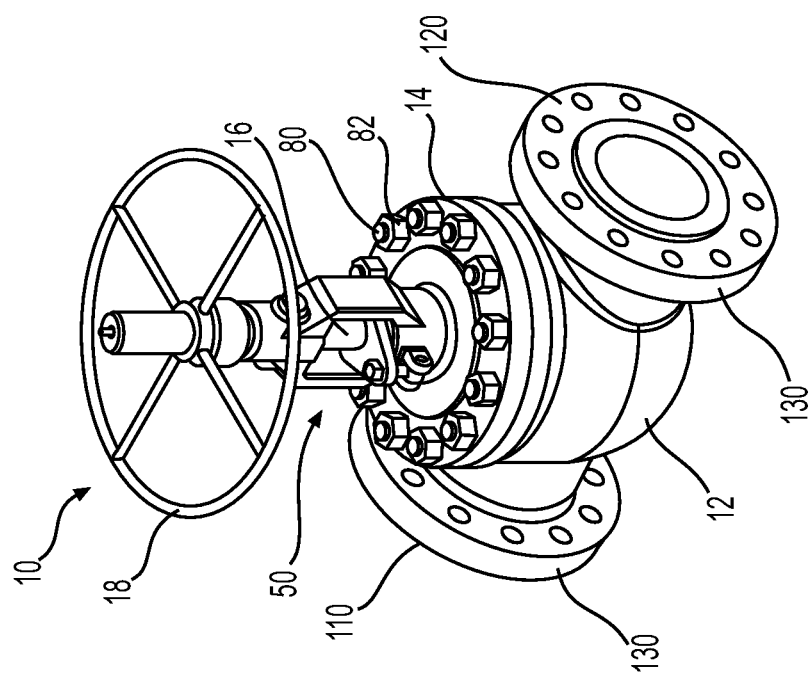
FIG. 2 is a top view of the rising stem ball valve system of FIG. 1.

FIGS. 1 and 2 are perspective and top views, respectively, of a ball valve assembly or ball valve system 10, according to aspects of the present disclosure. In some aspects, ball valve system 10 may be a rising stem ball system. Ball valve system 10 may include a body 12 extending from an upstream end 110 to a downstream end 120. Annular flanges or ports 130, formed at upstream and downstream ends 110 and 120, may be sized and shaped for connection to upstream and downstream pipeline components, and may include a series of bolt holes to allow ports 130 to facilitate leak-free connections to these components.

A bonnet 14 may be secured to a top surface of body 12. A stem 16 may extend through bonnet 14 and within body 12. Stem 16 may be secured to an actuation device 18 at a proximal portion of ball valve system 10 to facilitate actuation of ball valve system 10. Bonnet 14 may be secured to body 12 by a series of fasteners 80, such as threaded bolts or studs, and fixing members 82, such as nuts.

Body 12 may be formed of any suitable corrosion-resistant material, such as a metal material. In particular, body 12 may be formed by carbon steel, for example. Bonnet 14, like body 12, may be formed by a metal material, such as carbon steel. Stem 16 may be formed of metal, such as stainless steel, and, in particular, 17-4 stainless steel.

A gland 50 included in bonnet 14 may facilitate leak-free operation of stem 16. Gland 50 may include, for example, packing for preventing leaks, as well as retaining features for securing this packing adjacent to stem 16, as described below. As best shown in FIG. 1, a proximal portion of stem 16 above gland 50 may be connected to an actuation device 18 such as a hand-wheel or a pneumatic or hydraulic actuator. Actuation of device 18 may be configured to move stem 16 in an actuation direction (e.g., raise or lower stem 16), without causing rotation of stem 16.

FIG. 2 is a top view of the ball valve system 10 of FIG. 1. Bonnet 14 of valve system 10 may support and secure stem 16 therein. An upper surface 104 of bonnet 14 forming a flange may project proximally away from body 12 toward a proximal end of stem 16. A packing injection fitting 59 (FIG. 3) may be provided on bonnet 14 to facilitate insertion of packing material. Upper surface 104 and stem 16 may be provided at a central portion of valve system 10 between upstream end 110 and downstream end 120.

FIG. 3 is a cross-sectional view of ball valve system 10 along line III-III of FIG. 2. As shown in FIG. 3, the proximal end of stem 16 may be positioned within a stem protector 22 that extends above actuation device 18. A distal end 20 of stem 16 may be positioned within body 12. An indicator 21 may be secured to the proximal end of stem 16 so as to extend through a top surface of stem protector 22 and indicate a state of ball valve system 10. A stem nut 24 fixed to actuation device 18 may surround a threaded portion of stem 16. Stem nut 24 may include an internally-threaded interior positioned on matching threading of stem 16 such that rotation of nut 24 due to movement of actuation device 18 causes stem 16 to rise and fall.

A thrust bearing assembly having proximal 26 and distal 28 portions may be provided within a retainer 32. This thrust bearing assembly may be configured to prevent translation of stem nut 24, while allowing stem nut 24 to rotate. Thus, rotation of stem nut 24 may cause stem 16 to translate upward or downward in an actuation direction aligned with axis X, for example. This translation of stem 16 may occur without rotation of stem 16, due at least in part to the containment of stem nut 24 by a proximal end of bonnet 14, a recess 36, and a guide member 34. However, in some aspects, ball valve system 10 may include a rotatable stem, as described below with respect to FIGS. 7-10.

A longitudinally-extending recess 36 may be formed in a proximal portion of stem 16. If desired, recess 36 may provide resistance to rotation of stem 16. As shown in FIG. 3, recess 36 may be shaped to receive one or more anti-rotation pins or guiding members 34. Recess 36 may extend linearly (e.g., without bends or turns) along axis X (proximal-to-distal). Thus, when stem 16 moves vertically (proximally or distally) recess 36 may slide along guiding members 34.

A gland 50 of ball valve system 10 may include components positioned distally with respect to guiding members 34 and recess 36. Gland 50 may include a gland flange 52 formed integrally with a gland ring 54 secured within bonnet 14. As shown in FIG. 3, a stem seal 56 may be sandwiched between gland ring 54 and a gland bushing 58. Stem seal 56 may include an injected packing introduced to an interior of bonnet 14 via one or more packing fittings 59. Once positioned, stem seal 56 may be configured to seal and prevent fluid communication between the interface of stem 16 and bonnet 14. An interface between body 12 and bonnet 14 below gland 50 may be sealed against leaks by a gasket 60. If desired, stem seal 56 may be formed by a braided or unbraided packing material placed without use of fittings 59, such as a flexible graphite (e.g., GRAFOIL®) rope.

A distal end portion of stem 16 may include a twist portion 90 that extends through an opening of a ball 64. Twist portion 90 may be positioned distally with respect to the components of gland 50. Twist portion 90 may be configured to interact with one or more positioning members 62, such as pins, to bring ball 64 into rotation and open or close ball valve system 10. For example, twist portion 90 may be configured to slide with respect to positioning members 62, without rotating.

Positioning members 62 may positioned on diametrically opposite sides of twist portion 90 so as to facilitate rotation of ball 64 with respect to a vertical axis, such as axis X. For example, twist portion 90 may include one or more guiding surfaces configured to press upon and rotate positioning members 62, as described below. Each positioning member 62 may be rotatable about a vertically-extending axis parallel to axis X in FIG. 3. During this rotation, each positioning member 62 may contact and rotate ball 64, causing members 62 and ball 64 to rotate together and open or close valve system 10.

Ball 64 may be rotatable between an open position and a closed position to respectively permit or block a flow of fluid from upstream end 110 to downstream and 120. In the positon illustrated in FIG. 3, ball 64 closes valve system 10 to block the flow of fluid. Ball 64 may include a central channel or passage 66 extending therethrough such that, when ball 64 is in the open position, passage 66 extends approximately parallel to, or aligned with, a direction extending from upstream end 110 to downstream end 120.

Ball 64 may be received by a valve seat assembly formed by a valve seat retainer 70, a seat ring 72, and a seat insert 75, as shown in FIGS. 3 and 5. Valve seat retainer 70 and seat ring 72 may be separably coupled to each other, as described below. One or more seals 84, such as an O-ring, may facilitate the formation of a seal between this valve seat assembly (valve seat retainer 70 and seat ring 72) and body 12.

A bearing 68 may support and facilitate rotation of ball 64. Bearing 68 may be formed of a low-friction material configured to allow substantially frictionless rotation of ball 64. A removable support 65 at a bottom of valve system 10 may facilitate maintenance and/or replacement of bearing 68. Support 65 may either be formed separately of bearing 68, as shown in FIG. 3, or integrally with bearing 68.

FIG. 4 is a cross-sectional view of a proximal portion of rising stem ball valve system 10 with a modified configuration, according to one or more aspects of the present disclosure. Each of the features of FIG. 4 may be used with the features shown in FIG. 3 and/or FIG. 10, without departing from the scope of this disclosure. Similarly, each of the features of FIG. 3 and/or FIG. 10 may be used with the exemplary configuration illustrated in FIG. 4. FIG. 4 may correspond to a cross-sectional view of valve system 10 along line IV-IV in FIG. 2. As shown in FIG. 4, ball valve system 10 may include a lubrication system or assembly 40 to lubricate moving parts for actuating ball 64, such as stem 16 or stem 160, described below. Lubrication assembly 40 may be secured, for example, to bonnet 14. Lubrication assembly 40 may include a lubrication port 42 configured to receive a lubricant, such as grease, and supply lubricant to a location within bonnet 14. For example, lubrication port 42 may include a grease cup.

Lubrication port 42 may be configured to provide lubricant to the recesses 36 of stem 16 by suppling grease, for example, from a grease gun connected to lubrication port 42. This grease or lubricant may be supplied by an internal channel 43, represented by a dashed line extending through anti-rotation pins or guiding members 34A.

Guiding members 34A may be configured to act as a rotation-prevention device, as well as a lubrication supplying device. To prevent rotation of stem 16, guiding members 34A may include pin members that extend within recess 36 of stem 16. Guiding members 34A, like pins or guiding members 34, may facilitate rotation-free translation of stem 16 in combination with respective linearly-extending recesses 36. In the exemplary configuration shown in FIG. 4, the proximal portion of stem 16 may include a plurality of linearly-extending recesses 36 that each receive a respective anti-rotation pin or member 34A. Recesses 36 may include a pair of side walls positioned on opposite sides of each member 34A to prevent undesired rotation of stem 16. Alternatively, in at least some embodiments of ball valve system 10, guiding members 34A may be configured to cause rotation of a stem 160 by cooperating with one or more angled recesses, as described below.

A gland 50A may include a stem seal 56A positioned between a gland flange 52A and a gland seat 58A. Stem seal 56A may be configured to seal a portion of stem 16 distal of recesses 36. Stem seal 56A may be include an injected packing material or another suitable material, as discussed above with respect to stem seal 56. Gland 50A may facilitate the injection of packing material, for example, via one or more packing fittings 59 (not shown in FIG. 4), as also discussed above. For example, stem seal 56A may include an injectable packing material.

One or more of stem 16, anti-rotation pins or guiding members 34, and anti-rotation pins or guiding members 34A may be formed of a material configured to reduce galling. In one aspect, a metal material such as a Nitronic alloy may be included in for one or more of stem 16A and guiding members 34 or 34A. An exemplary suitable Nitronic alloy may be Nitronic 60. However, other suitable low-friction and galling-resistant materials may be used. Use of a galling-resistant material may reduce a transfer of material between stem 16 and members 34 and 34A.

FIG. 5 is a detailed view of valve seat retainer 70 seat ring 72, and seat insert 75, which together may form a valve seat assembly for sealing ball valve system 10. Valve seat retainer 70 may be secured within body 12 and configured to receive and secure seat ring 72 such that ring 72 abuts ball 64 when valve system 10 is closed. Seat ring 72 may include a sealing surface (e.g., a chamfered surface) configured to contact and seal ball 64. If desired, this surface may be included on a seal 75 of seat ring 72. Seat ring 72 may also include one or more recesses 77 for inserting seals, such as gaskets or O-rings, between seat ring 72 and seat retainer 70.

Seat retainer 70 and seat ring 72 may be formed with a twist or rotation locking mechanism configured to secure seat ring 72 within seat retainer 70 to form an integrated seat assembly. For example, seat ring 72 may include one or more protrusions or tabs 74 that are releasably or removably received by a respective groove or recess 76 in valve seat retainer 70. Seat ring 72 may be separated from valve seat retainer 70 and replaced, if necessary, by rotating seat ring 72 with respect to seat retainer 70 (e.g., about a horizontally-extending axis Y perpendicular to axis X), to facilitate inline removal and replacement of seat ring 72. In an exemplary locking mechanism, tabs 74 may be separately formed at one or more circumferential positions of an outer surface of seat ring 72, so as to protrude radially outward from seat ring 72. Recesses 76 may be formed by pockets or grooves extending in portions of valve seat retainer 70.

Recesses 76 may be part of a pathway for guiding tabs 74 such that tabs 74 and recesses 76 form a cam mechanism. For example, in order to assemble seat retainer 70 and seat ring 72, seat ring 72 may be advanced axially, e.g., along direction Y. During this axial movement, tabs 74 may travel through axially-extending recesses or channels formed in seat retainer 70 (represented by dashed lines adjacent to tabs 74 in FIG. 5). Once at a predetermined axial depth, seat ring 72 may then be rotated with respect to seat retainer 70. This rotation may locate each tab 74 within a respective recess 76, as shown in FIG. 5.

In addition to, or instead of, the above-described configuration including tabs 74 and recesses 76 seat retainer 70 and seat ring 72 may be secured to each other by any other suitable mechanism. While FIG. 5 illustrates protrusions or tabs 74 on seat ribs 72 and recesses 76 on valve seat retainer 70, if desired, the location of tabs 74 and recesses 76 may be reversed such that valve seat retainer 70 includes inwardly-protruding tabs 74, and seat ring 72 includes appropriately spaced recesses.

FIGS. 6A and 6B are detailed views of twist portion 90 of the distal end of stem 16. Twist portion 90 may be integrally formed in stem 16 such that stem 16 and twist portion 90 form a single unitary member. In some configurations, stem 16 and twist portion may be monolithically formed. This may be accomplished by machining or otherwise removing material to form twist portion 90 in the distal end of stem 16. Additionally or alternatively, a twisting process may form twist portion 90 on stem 16. As can be seen in FIGS. 6A and 6B, twist portion 90 and stem 16 may be formed free of sharp edges or rough surfaces, such as weld fillets. Stem 16, including twist portion 90, may be formed of a heat-treated material that is resistant to galling. In particular, stem 16, including twist portion 90, may be formed with a metallic material, such as 17-4 HH900 stainless steel.

Twist portion 90 may include a pair of diametrically-opposed guide surfaces 92, each of which traverses approximately 90 degrees along a circumference of stem 16, forming curved portions. Each guide surface 92 may include a proximal end 94 extending from a substantially cylindrical portion of stem 16. Guide surfaces 92 may terminate at distal end 20, forming a pair of approximately parallel straight edges at end 20. A width of distal end 20 may be reduced between guide surfaces 92.

At least twist portion 90, and if desired, an entirety of stem 16, may be formed of a hardened material that may reduce wear during movement along positioning members 62 (FIG. 3). Thus, when mechanical input causes stem 16 to move upward or downward, the twist portion 90 slides within ball 64 such that guide surfaces 92 press upon positioning members 62, causing ball 64 to rotate. For example, by moving stem 16 from a lowest position (FIG. 3) to a highest position, ball 64 may rotate about 90 degrees, opening the valve system 10.

Figure 10:
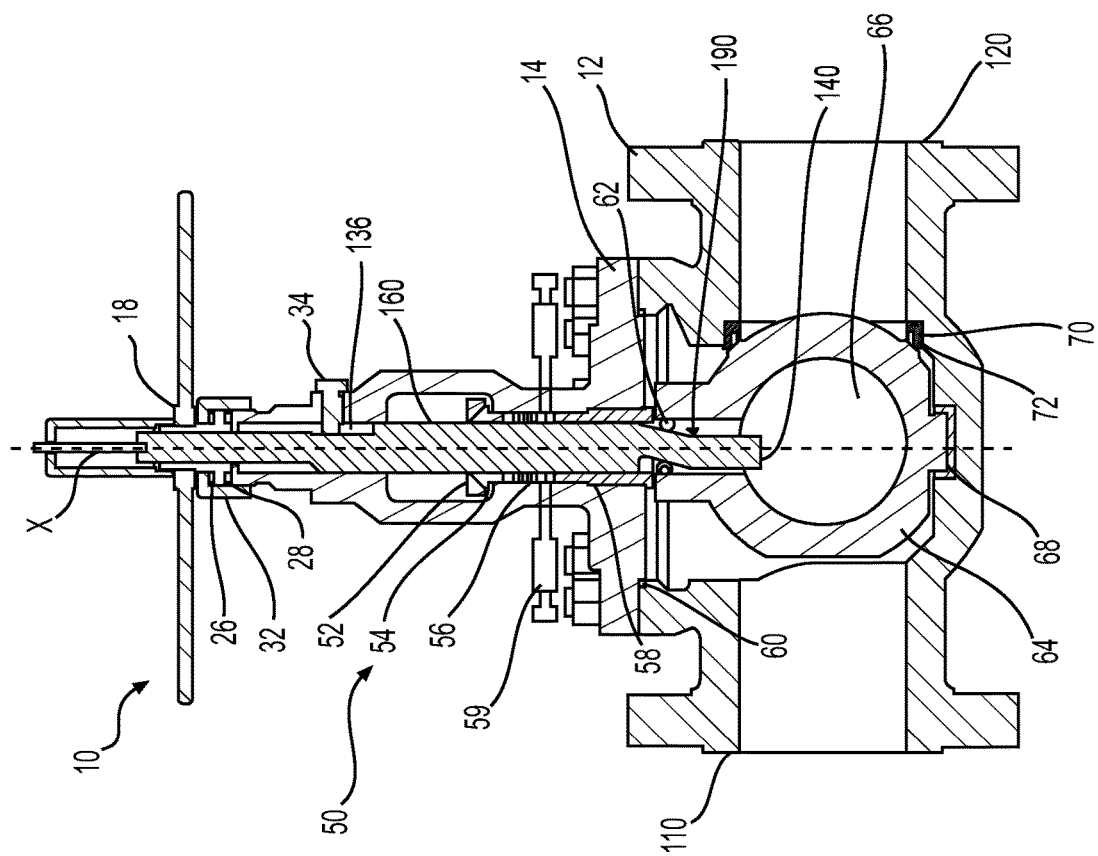
FIG. 10 is a perspective view of the rising stem ball valve system with the stem of FIG. 7.

FIG. 7 is a perspective view of a stem 160 having a distal end portion 190 formed without a twist portion. Stem 160 may extend from a narrowed proximal end portion 162 to a distal end 140 that is positioned within ball 64 (FIG. 10). Stem 160 may include an angled recess 136 extending in an enlarged portion of a body of stem 160 between proximal end portion 162 and distal end 140. Angled recess 136 may include a bottom or distal end 138 (FIG. 9B) and at least one turn formed by an angled or curved path. Recess 136 may cover approximately 90 degrees around a circumference of stem 160, and may cause stem 160 to rotate by approximately 90 degrees when stem 160 is moved from a lowest position to a highest position. For example, recess 136 may include a pair of sidewalls that are shaped to receive and contact protruding portions of members 34 or 34A (FIGS. 3, 4, and 10) such that sliding motion of recess 136 along members 34 or 34A causes stem 160 to rotate.

Distal end portion 190 may include one or more additional recessed portions formed, for example, by removing material from (e.g., by machining) stem 160. Distal end portion 190 may include a first guiding surface 192 and a diametrically-opposed second guiding surface 194, best shown in FIGS. 9A and 9B. With reference to FIG. 7, a pair of curved surfaces may extend from first guiding surface 192 to second guiding surface 194.

FIG. 8 is a top view of stem 160, showing a channel or recess 136. While FIG. 8 illustrates a configuration where a single recess 136 is formed in stem 160, stem 160 may instead include a plurality of recesses 136. For example, a pair of diametrically-opposed recesses 136 may be formed in stem 160 for use with a pair of corresponding members 34A. Recess 136 may be configured to receive lubricating material in the manner described above with respect to recess 36 and lubrication ports 42 to reduce wear and/or galling.

FIGS. 9A and 9B are front and side views, respectively, of stem 160. Distal end 140 of stem 160 may be formed with a pair of guide surfaces 192 and 194 that are both free of turns and shaped to slide along a positioning member 62. A first guide surface 192 may include a narrowed proximal end 195 that gradually broadens in a direction toward distal end 140. Second guide surface 194 may include a broadened proximal end 196 that gradually narrows towards distal end 140. Each of the first and second guide surfaces 192 and 194 may also include portions extending from distal end 140 that have an approximately constant width, as best shown in FIGS. 7 and 9A. As shown in FIG. 9B, proximal ends 195 and 196 may be formed in planes that are approximately parallel to each other. Distal portions of guide surfaces 192 and 194 may also be formed in approximately parallel planes (e.g., planes that are parallel to a vertical axis).

FIG. 10 is a cross-sectional view of ball valve system 10 including a stem 160 having a distal end portion 190 formed without a twist. System 10, as shown in FIG. 10, may also include any of the above-described features of FIGS. 1-5, including the above-described valve seat assembly including valve seat retainer 70, seat ring 72, and seat insert 75 (FIG. 5). Stem 160 may include a proximal end that is configured to be raised and lowered by actuation device 18. If desired, a portion of stem 160 including recess 136 and distal end portion 190 may be rotatably coupled to a proximal threaded portion, such that portions of stem 160 located distally of the threaded portion are configured to rotate with respect to a threaded portion that moves upward and downward without rotating.

A process of operating rising stem ball valve system 10 may include operating actuation device 18. For example, by rotating a handwheel, nut 24 may rotate, drawing stem 16 upward or downward. Rotation of stem 16 may be restricted by one or more recesses 36, 36A, and guiding members 34. Twist portion 90 may advance with respect to positioning members 62 such that each positioning member 62 slides along a respective guide surface 92 formed in twist portion 90. Positioning members 62 may be driven into rotation by twist portion 90 such that positioning members 62 contact ball 64 and rotate ball 64 about a vertical axis (e.g., axis X).

In configurations of rising stem ball valve system 10 that include a rotatable stem 160, actuation device 18 may cause stem 160 to rotate while being drawn upward or downward, due to a guiding path formed in recess 136 and extending to a distal end 138. Distal end portion 190 of stem 160 may translate vertically and move rotationally about axis X, to both slide along, and rotate, positioning members 62. In particular, the rotation of distal end portion 190 may be driven by an interaction between one or more guiding members 34 or 34A and angled recess 136, to move ball 64 between open and closed positions. For example, when stem 160 is in a lowest position, ball 64 may close ball valve system 10. When stem 160 is actuated to a highest position, stem 160 and ball 64 may rotate by about 90 degrees, fully opening ball valve system 10.

Assembly of rising stem ball valve system 10 may include securing a removable seat ring 72 adjacent to ball 64. For example, seat ring 72 may be inserted via a twist lock mechanism that retains seat ring 72 with protrusions or tabs 74. When necessary, maintenance may be performed on ball valve system 10 by introducing lubricant through channels 43 formed in lubrication ports 42. Lubricant may be supplied to recesses 36 of stem 16 or recesses 136 of stem 160, and to guiding members 34A, further reducing wear and galling. Maintenance may further include removing seat ring 72, e.g., by operating the above-described twist lock mechanism. This may be performed inline (e.g., without removing valve system 10 from a series of connected pipeline components).

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of assembling a ball valve system, the method comprising:
    securing a ball within a body, the body including an upstream end and a downstream end;
    inserting a vertically-translateable stem within the ball, the stem including a linearly-extending proximal recess configured to prevent rotation of the stem and a distal recess that includes a twist forming a pair of diametrically-opposed guide surfaces which each extend about 90 degrees along a circumference of the stem, the stem being configured to translate vertically, without rotating, to actuate the ball;
    forming a lubrication channel in the ball valve system, the lubrication channel being positioned to supply lubricant to the proximal recess; and
    inserting a removable valve seat ring within a valve seat retainer, the removable valve seat ring being configured to receive and contact a portion of the ball with a seat insert.

2. The method of claim 1, wherein the proximal recess extends substantially vertically.

3. The method of claim 1, wherein the lubrication channel extends through a retaining pin positioned within the proximal recess.

4. The method of claim 1, wherein the valve seat ring is removable from the valve seat retainer by rotating the valve seat ring and separating the valve seat ring and valve seat retainer.

5. The method of claim 1, further including securing a pair of rotatable positioning pins on diametrically opposite sides of the distal recess of the stem such that the positioning pins slide along the diametrically-opposed guide surfaces when the stem translates vertically.

6. The method of claim 5, wherein the distal recess is performed by machining a distal end portion of the stem.

* * * * *